US011116186B2

(12) United States Patent
Yu et al.

(10) Patent No.: US 11,116,186 B2
(45) Date of Patent: Sep. 14, 2021

(54) AQUARIUM

(71) Applicant: GUANGDONG BOYU GROUP CO., LTD, Guangdong (CN)

(72) Inventors: Youkai Yu, Guangdong (CN); Bingyan Yu, Guangdong (CN); Jianqin Yu, Guangdong (CN)

(73) Assignee: GUANGDONG BOYU GROUP CO., LTD

( * ) Notice: Subject to any disclaimer, the term of this patent is extended or adjusted under 35 U.S.C. 154(b) by 0 days.

(21) Appl. No.: 15/774,362

(22) PCT Filed: May 3, 2018

(86) PCT No.: PCT/CN2018/085492
§ 371 (c)(1),
(2) Date: May 8, 2018

(87) PCT Pub. No.: WO2018/202090
PCT Pub. Date: Nov. 8, 2018

(65) Prior Publication Data
US 2020/0281172 A1    Sep. 10, 2020

(30) Foreign Application Priority Data

May 4, 2017   (CN) .......................... 201720485488.0
Jul. 31, 2017  (CN) .......................... 201720945709.8

(51) Int. Cl.
*A01K 63/04*    (2006.01)
*A01K 63/00*    (2017.01)
*F04D 13/08*    (2006.01)

(52) U.S. Cl.
CPC .......... *A01K 63/047* (2013.01); *A01K 63/003* (2013.01); *F04D 13/08* (2013.01)

(58) Field of Classification Search
CPC .... A01K 63/00; A01K 63/003; A01K 63/006; A01K 63/04; A01K 63/047
See application file for complete search history.

(56) References Cited

U.S. PATENT DOCUMENTS 3,392,836 A * 7/1968 Willinger ............... A01K 63/04
                                                  210/167.21
3,481,586 A * 12/1969 Roberts ................... F04D 13/02
                                                  366/264

(Continued)

FOREIGN PATENT DOCUMENTS

CN    103441600    12/2013
CN    204540429    8/2015

(Continued)

OTHER PUBLICATIONS

Patent Cooperation Treaty (PCT), International Search Report and Written Opinion for Application PCT/CN2018/085492 filed May 3, 2018, dated Jul. 19, 2018, International Searching Authority, CN.

(Continued)

*Primary Examiner* — Michael H Wang
(74) *Attorney, Agent, or Firm* — McDonald Hopkins LLC (57) ABSTRACT

An aquarium includes a tank body and a water pump, wherein the water pump includes a stator and a rotor and the tank body includes a tank wall; a rotor chamber arranged at one side of the tank wall close to inside of the tank body and configured to accommodate the rotor; a rotation shaft configured to support the rotor and arranged in the rotor chamber; an impeller configured to connect with the rotor and arranged in the rotor chamber; and a stator chamber configured to accommodate the stator, arranged at one side of the tank wall close to outside of the tank body and arranged corresponding to the rotor chamber so that the stator can drive the rotor.

17 Claims, 11 Drawing Sheets

(56) References Cited

U.S. PATENT DOCUMENTS

| | | | |
|---|---|---|---|
| 4,247,265 A | | 1/1981 | Cavalcante |
| 4,285,813 A | * | 8/1981 | Stewart et al. ........ A01K 63/04 210/167.25 |
| 4,408,891 A | * | 10/1983 | Schirk et al. ................. 366/265 |
| 4,512,724 A | * | 4/1985 | Horvath ........................ 417/319 |
| 4,602,996 A | * | 7/1986 | Willinger ............... A01K 63/04 210/136 |
| 4,735,715 A | * | 4/1988 | Willinger ............... A01K 63/04 210/167.27 |
| 4,761,227 A | * | 8/1988 | Willinger et al. ..... A01K 63/04 210/167.27 |
| 5,603,831 A | * | 2/1997 | Hickok .................. A01K 63/04 210/601 |
| 6,041,740 A | * | 3/2000 | Newman ................ A01K 63/04 119/261 |
| 7,313,840 B2 | * | 1/2008 | Watkins .................... A47L 1/09 15/103 |
| 7,393,188 B2 | * | 7/2008 | Lawyer et al. ......... F04B 17/00 417/420 |
| 8,282,267 B2 | * | 10/2012 | Castillo et al. ......... B01F 13/08 366/262 |
| 9,497,942 B2 | * | 11/2016 | Herman .................. A01K 63/04 |
| 9,551,343 B2 | * | 1/2017 | Marks et al. ......... F04D 29/043 |
| 9,572,747 B2 | * | 2/2017 | Tran et al. ............. A61H 33/00 |
| RE47,580 E | * | 8/2019 | Costa ..................... A01K 63/04 |
| 2009/0226335 A1 | | 9/2009 | Lee |

FOREIGN PATENT DOCUMENTS

| | | |
|---|---|---|
| CN | 206744307 | 12/2017 |
| CN | 207011538 | 2/2018 |
| EP | 1849355 A2 | 10/2007 |
| JP | 1198750 | 4/1999 |

OTHER PUBLICATIONS

Extended European Search Report dated Dec. 3, 2020; European Patent Application No. 18794125.7.

* cited by examiner

AQUARIUM

CROSS-REFERENCE TO RELATED APPLICATION

This application is a 35 U.S.C. 371 national stage filing of PCT Application No. PCT/CN2018/085492 filed on May 3, 2018, which claims priority to Chinese Patent Application No. 201720485488.0 filed on May 4, 2017, and Chinese Patent Application No. 201720945709.8 filed on Jul. 31, 2017, each of which are incorporated herein in their entirety by reference.

TECHNICAL FIELD

The present disclosure relates to the technical field of tank bodies, and for example, relates to an aquarium.

BACKGROUND

To enable a water body in a tank to flow and circulate or filter the water body in the tank, an individual water pump is generally adopted in an aquarium for pumping water. The water pump can be installed in the following two modes. 1. A submersible pump is adopted as the water pump. The submersible pump is installed in the tank of the aquarium. This installation mode has a problem that a pump body and a power line are soaked in water for a long time. When electric leakage occurs in the pump body or the power line, the water body in the entire aquarium have a potential safety hazard of electrification, and the power line needs to enter the tank from an upper opening of the aquarium, influencing a beautiful appearance of the aquarium. 2. The water pump is installed outside the tank. The water body in the tank is connected through a pipe. This installation mode has a defect of complicated pipe connection, influencing the appearance of the aquarium.

SUMMARY

The present disclosure provides an aquarium which can ensure that a stator and a power line and other electrified components of a water pump, are not soaked in water, thereby effectively avoiding electric leakage and improving an entire appearance of the aquarium.

An embodiment provides an aquarium. The aquarium includes: a tank body and a water pump, wherein the water pump includes a stator and a rotor and the tank body includes a tank wall; a rotor chamber arranged at one side of the tank wall close to inside of the tank body and configured to accommodate the rotor; a rotation shaft configured to support the rotor and arranged in the rotor chamber; an impeller configured to connect with the rotor and arranged in the rotor chamber; and a stator chamber configured to accommodate the stator, arranged at one side of the tank wall close to outside of the tank body and arranged at a position corresponding to a position of the rotor chamber so that the stator drives the rotor.

In an embodiment, the rotor chamber is arranged on a bottom wall of the tank body.

In an embodiment, an accommodating groove is formed concavely towards the inside of the tank body at a part of the bottom wall of the tank body; the rotor chamber is formed concavely towards inside of the accommodating groove at a part of a bottom plate of the accommodating groove; an opening of the rotor chamber faces to the inside of the tank body; and the accommodating groove is not communicated with the rotor chamber.

In an embodiment, the aquarium further includes a pumping house arranged on the bottom plate of the accommodating groove and located in the tank body; the pumping house is communicated with the inside of the tank body and the rotor chamber respectively; and a water inlet and a water outlet are formed on the pumping house.

In an embodiment, the aquarium further includes a base arranged under a bottom of the tank body; the stator chamber is fixedly arranged on the base; and when the base is installed under the bottom of the tank body, the stator chamber is located in the accommodating groove.

In an embodiment, a power line channel for accommodating a power line of the water pump is arranged on the base; a first end of the power line channel is communicated with the stator chamber; and a second end of the power line channel extends to outside of the base.

In an embodiment, the pumping house includes a pumping house side wall and a pumping house cover; the pumping house side wall is fixedly arranged on the bottom plate of the accommodating groove to form a space for accommodating the impeller; and the pumping house cover is arranged at one end of the pumping house side wall facing away from the bottom plate of the accommodating groove and is configured to block the space.

In an embodiment, the aquarium further includes a pumping house accommodating groove; the pumping house accommodating groove is disposed at one side of the rotor chamber along a horizontal direction and is communicated with the rotor chamber; one side of the pumping house is connected with a rotor seat; the rotor is arranged in the rotor seat; the impeller is arranged in the pumping house; the rotor seat is arranged in the rotor chamber; and the pumping house is arranged in the pumping house accommodating groove.

In an embodiment, the aquarium further includes a connecting seat circularly arranged in the tank body and located on the bottom plate; an opening of the connecting seat faces to an opening of the tank body; the pumping house accommodating groove and the rotor chamber are arranged in the connecting seat; a lower water inlet is formed at a lower end of the connecting seat; a connecting plate is arranged at the opening of the connecting seat; the connecting plate is detachably connected with the rotor seat; a water guiding cylinder is fixedly connected with one side of the connecting plate facing away from the rotor seat; and openings are respectively formed at both ends of the water guiding cylinder.

In an embodiment, the water outlet is formed on a top of the pumping house; the water outlet is connected with a drain pipe; the pumping house is provided with a pumping house cover at one side of the pumping house facing away from the rotor seat; and the water inlet is formed on the pumping house cover.

In an embodiment, a connecting plate water inlet and a connecting plate water outlet are formed in the connecting plate.

In an embodiment, the rotor chamber is arranged at one side of the side wall of the tank body close to the inside of the tank body; the stator chamber is arranged at one side of the side wall of the tank body close to the outside of the tank body; and a position of the rotor chamber corresponds to a position of the stator chamber so that the stator drives the rotor.

In an embodiment, an accommodating groove is formed by partially concaving a side wall of the tank body towards the inside of the tank body; the rotor chamber is formed by partially concaving a bottom plate portion of the accommodating groove towards inside of the accommodating groove; an opening of the rotor chamber faces to the inside of the tank body; and the accommodating groove is not communicated with the rotor chamber.

In an embodiment, the stator is encapsulated in the stator chamber.

In an embodiment, the stator chamber and the tank body are integrally formed.

The present disclosure not only can enable the stator located outside of the tank body to drive the rotor located inside of the tank body to ensure normal operation of the water pump, but also can prevent the stator and other electrified components from coming into contact with water in the tank body, thereby effectively preventing electric leakage of the electrified components.

1. Tank body;
11. Rotor chamber;
12. Bottom wall;
13. Accommodating groove;
131. Bottom plate;
14. Pumping house accommodating groove;
15 Connecting seat;
151. Lower water inlet;
16. Stator iron core accommodating groove;
17. Side wall;
2. Water pump component;
21. Stator;
22. Rotor;
23. Rotation shaft;
231. First rotation shaft end part;
232. Second rotation shaft end part;
24. Impeller;
25. Pumping house;
251. Water inlet;
252. Water outlet;
253. Pumping house side wall;
254. Pumping house cover;
26. Drain pipe;
27. Water guiding cylinder;
28. Connecting plate;
281. Connecting plate water inlet;
282. Connecting plate water outlet;
29. Rotor seat;
3. Base;
31. Stator chamber;
32. Power line channel;
33. Base body;
34. Base side wall;
35. Encapsulating chamber;
36. Isolation chamber;
4. Limiting mechanism;
41. Limiting sheath;
42. Limiting groove;
43. Limiting clamping spring;
431. Clamping spring body;
432. Clamping hole;
433. Clamping spring opening;
44. Limiting hole; and
45. Limiting bolt.

DETAILED DESCRIPTION

In description of the present embodiment, unless otherwise clearly specified and defined, terms such as "connected", "connection" and "fixed" shall be understood in a broad sense, and for example, may refer to fixed connection or detachable connection or integral connection; may refer to mechanical connection or electrical connection; may refer to direct connection or indirect connection through an intermediary; and may refer to internal communication between two elements or interaction relationship between two elements. For those ordinary skilled in the art, specific meanings of the above terms in the present embodiment may be understood according to specific conditions.

As shown in FIG. 1 to FIG. 4, an aquarium in the present embodiment includes a tank body 1 and a water pump component 2. The water pump component 2 includes a water pump. The water pump includes a stator 21 and a rotor 22. The tank body 1 includes a tank wall; a rotor chamber 11 configured to accommodate the rotor 22 is arranged at one side of the tank wall close to inside of the tank body 1, and a rotation shaft 23 configured to support the rotor 22 and an impeller 24 connected with the rotor 22 are arranged in the rotor chamber 11. A stator chamber 31 configured to accommodate the stator 21 is arranged at one side of the tank wall close to outside of the tank body 1, and the stator chamber 31 is arranged at a position corresponding to a position of the rotor chamber 11. Since the rotor 22 and the stator 21 of the water pump are respectively arranged on an inner side and an outer side of the tank body 1, the stator 21 located outside the tank body 1 can drive the rotor 22 located inside the tank body 1 to ensure normal operation of the water pump and prevent the stator 21 and other electrified components from coming into contact with water in the tank body 1, thereby effectively preventing electric leakage of the electrified components. Since the stator 21 and other electrified components of the water pump are arranged on the outer side of the tank body 1, a power line does not need to enter the tank body 1 from an upper opening of the tank body 1, thereby increasing beautiful extent of the entire aquarium appearance.

In an embodiment, the stator 21 is encapsulated in the stator chamber 31. Since the stator 21 is encapsulated in the stator chamber 31, the water outside the tank body 1 can be effectively prevented from entering the stator chamber 31, thereby avoiding any possibility that the stator 21 contacts the water and reducing possibility of the electric leakage. In the present embodiment, the stator 21 is encapsulated in the stator chamber 31 through insulating resin.

In an embodiment, an encapsulating chamber 35 is arranged in the stator chamber 31. The stator 21 is encapsulated in the encapsulating chamber 35. This design can reduce dosage of encapsulating materials such as the insulating resin to a great extent.

In an embodiment, an isolating chamber 36 matched with the rotor chamber 11 is arranged in the encapsulating chamber 35, so as to avoid affecting the matching between the stator chamber 31 and the rotor chamber 11 caused by that the insulating resin enters a space in the isolating chamber 36 when the stator 21 is encapsulated.

In an embodiment, the rotor chamber 11 is arranged on a bottom wall 12 of the tank body 1.

In an embodiment, an accommodating groove 13 is formed concavely towards the inside of the tank body 1 at a part of the bottom wall 12 of the tank body 1; the rotor chamber 11 is formed concavely towards inside of the accommodating groove 13 at a part of a bottom plate 131 of the accommodating groove 13; an opening of the rotor chamber 11 faces to the inside of the tank body 1; the accommodating groove 13 is not communicated with the rotor chamber 11; and a height of the rotor chamber 11 is less than a height of the accommodating groove 13.

In the present embodiment, as shown in FIG. 1 to FIG. 5, an axis of the rotation shaft 23 is vertically arranged; the accommodating groove 13 is located at a center of the bottom wall 12 of the tank body 1, and presents a cylindrical shape with an open first end and a sealed second end; and the rotor chamber 11 is located at a center of the bottom plate 131 of the accommodating groove 13 and also presents a cylindrical shape with an open first end and a sealed second end. The accommodating groove 13 can be located at the center of the bottom wall 12 of the tank body 1, and can also be at any other position of the bottom wall 12 of the tank body 1. The accommodating groove 13 may be in a shape of a tank, a square tank or other special-shape structures. The rotor chamber 11 may be located at the center of the bottom plate 131 of the accommodating groove 13, and can also be at any other position of the bottom plate 131 of the accommodating groove 13. The rotor chamber 11 may be in a shape of a tank, a square tank or other special-shape structures.

A pumping house 25 is arranged on the bottom plate 131 of the accommodating groove 13 and located in the tank body 1; the pumping house 25 is respectively communicated with the inside of the tank body 1 and the rotor chamber 11; and a water inlet 251 and a water outlet 252 are formed on the pumping house 25. In addition, the rotor chamber 11 and the pumping house 25 are disposed from bottom to top along a vertical direction.

The pumping house 25 includes a pumping house side wall 253 fixedly arranged on the bottom plate 131 of the accommodating groove 13. A space for accommodating the impeller 24 is formed by the pumping house side wall 253. A pumping house cover 254 configured to block the space is arranged at one end of the pumping house side wall 253 facing away from the bottom plate 131 of the accommodating groove 13. The pumping house cover 254 is detachably installed on the pumping house side wall 253. The water inlet 251 and the water outlet 252 are formed on the pumping house cover 254. A drain pipe 26 is arranged at the water outlet 252.

A base 3 is arranged under a bottom of the tank body 1; the stator chamber 31 is fixedly arranged on the base 3; and when the base 3 is installed under the bottom of the tank body 1, the stator chamber 31 is located in the accommodating groove 13. In an embodiment, the stator chamber 31 and the base 3 are integrally formed. In an embodiment, the stator chamber 31 and the base 3 are formed by plastics through integrated injection molding.

A power line channel 32 for accommodating a power line of the water pump is arranged on the base 3; a first end of the power line channel 32 is communicated with the stator chamber 31; and a second end extends to outside of the base 3. By installing the power line channel 32 on the base 3, the power line can be hidden in the power line channel 32, thereby preventing the power line from directly contacting the water inside and outside the tank body 1 and reducing a possibility of electric leakage.

The base 3 includes a base body 33 and a base side wall 34 arranged at a periphery of the base body 33. When the tank body 1 is installed on the base 3, the base side wall 34 is sleeved outside the side wall 17 of the tank body 1. The power line channel 32 is arranged concavely in the base body 33, and the first end of the power line channel 32 is communicated with the stator chamber 31 located at the center of the base body 33 and the second end is communicated with the outside of the base 3.

In an embodiment, the rotor 22, the rotation shaft 23, the impeller 24 and the pumping house cover 254 are assembled into a whole. The four components are assembled into a whole, thereby reducing difficulty during disassembly, assembly or maintenance and facilitating cleaning and maintenance.

In another embodiment, as shown in FIG. 6 to FIG. 14, in the present embodiment, the rotation shaft 23 is arranged along a horizontal direction. A pumping house accommodating groove 14 communicated with the rotor chamber 11 is disposed at one side of the rotor chamber 11 along a horizontal direction. One side of the pumping house 25 is connected with a rotor seat 29; the rotor 22 is arranged in the rotor seat 29; the impeller 24 is arranged in the pumping house 25; the rotor seat 29 is arranged in the rotor chamber 11; and the pumping house 25 is arranged in the pumping house accommodating groove 14. The pumping house 25 is detachably installed in the tank body 1, thereby facilitating integral taking and installation of the rotor 22 of the water pump, reducing difficulty during disassembly, assembly or maintenance and facilitating cleaning and maintenance.

A connecting seat 15 is circularly arranged in the tank body 1 and located on the bottom plate 131; an opening of the connecting seat 15 faces to the opening of the tank body 1; the pumping house accommodating groove 14 and the rotor chamber 11 are arranged in the connecting seat 15; a lower water inlet 151 is formed at a lower end of the connecting seat 15; a connecting plate 28 is arranged at the opening of the connecting seat 15; the rotor seat 29 and the connecting plate 28 are detachably connected; a water guiding cylinder 27 is fixedly connected with one side of the connecting plate 28 facing away from the rotor seat 29; and openings are respectively formed at both ends of the water guiding cylinder 27. The connecting plate 28 and the rotor seat 29 are detachably connected, while the water guiding cylinder 27 and the connecting plate 28 are fixedly connected, so that the water guiding cylinder 27 is directly pulled out of a water surface to conduct disassembly and maintenance work when the rotor 22 of the water pump needs to be maintained, without a need of disassembling in the tank body 1 and avoiding a limit of a narrow space, thereby reducing maintenance and disassembly difficulty, facilitating production and installation and reducing production cost.

The water outlet 252 is formed at a top of the pumping house 25; the water outlet 252 is connected with a drain pipe 26; the pumping house 25 is provided with a pumping house cover 254 which is facing away from one side of the rotor seat 29; and the water inlet 251 is formed on the pumping house cover 254. The water pumped by the water pump through the drain pipe 26 is led to the water surface and then flows back into the aquarium, so as to realize flow of the water body in the aquarium and facilitate filtration, oxygen adding and the like.

The rotor seat 29 is fixedly connected with two connecting columns. The connecting columns are connected with one side of the connecting plate 28 facing away from the water guiding cylinder 27. In an embodiment, blind threaded holes are formed in the connecting columns along the vertical direction. Through holes corresponding to the blind threaded holes are formed in the connecting plate 28. Screws penetrate through the through holes and are tightened into the blind threaded holes, so that the connecting plate 28 is connected with the connecting columns. The rotor 22, the impeller 24, the rotation shaft 23 and the pumping house 25 form a pump core component. The pump core component, the water guiding cylinder 27 and the connecting plate 28 form the water pump component 2.

A connecting plate water inlet 281 and a connecting plate water outlet 282 are formed in the connecting plate 28. The connecting plate 28 closes an upper opening of the rotor chamber 11 and an upper opening of the pumping house accommodating groove 14. The water that enters the connecting seat 15 from the lower water inlet 151 of the connecting seat 15 enters the water guiding cylinder 27 through the connecting plate water inlet 281. Filtering material can be arranged in the water guiding cylinder 27. Treated water flows to the water inlet 251 of the pumping house 25 from the connecting plate water outlet 282.

Figure 1:
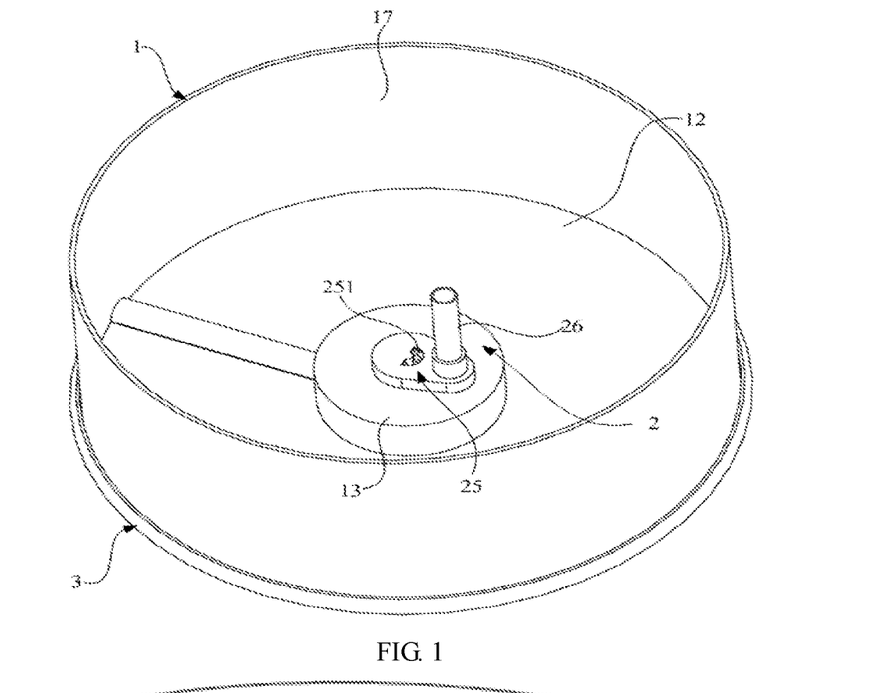
FIG. 1 is a perspective schematic diagram illustrating an aquarium in an embodiment.
Figure 2:
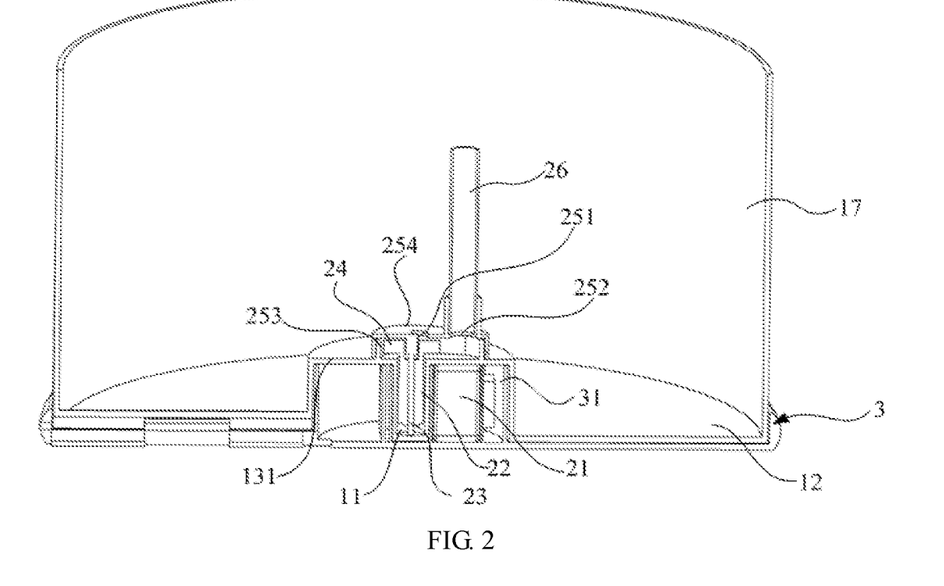
FIG. 2 is a sectional schematic diagram illustrating an aquarium in an embodiment.
Figure 3:
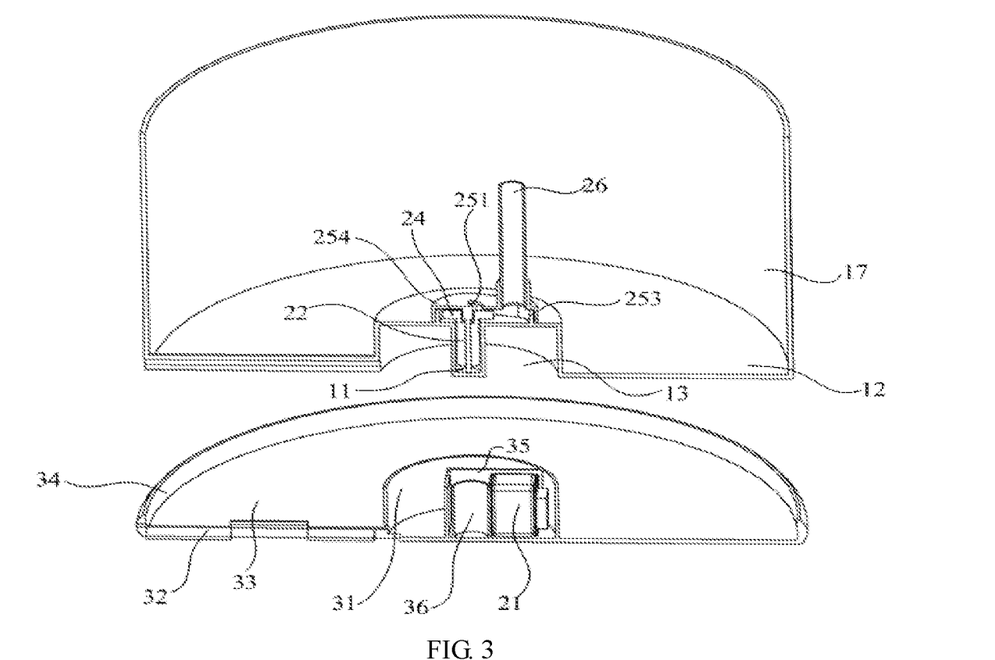
FIG. 3 is an exploded schematic diagram of FIG. 2.
Figure 4:
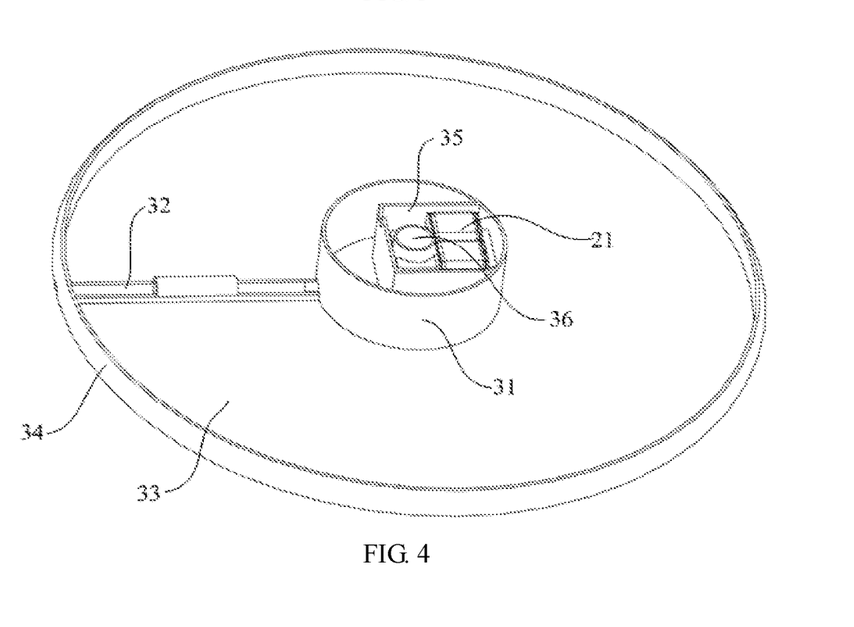
FIG. 4 is a perspective schematic diagram illustrating a base in an embodiment.
Figure 5:
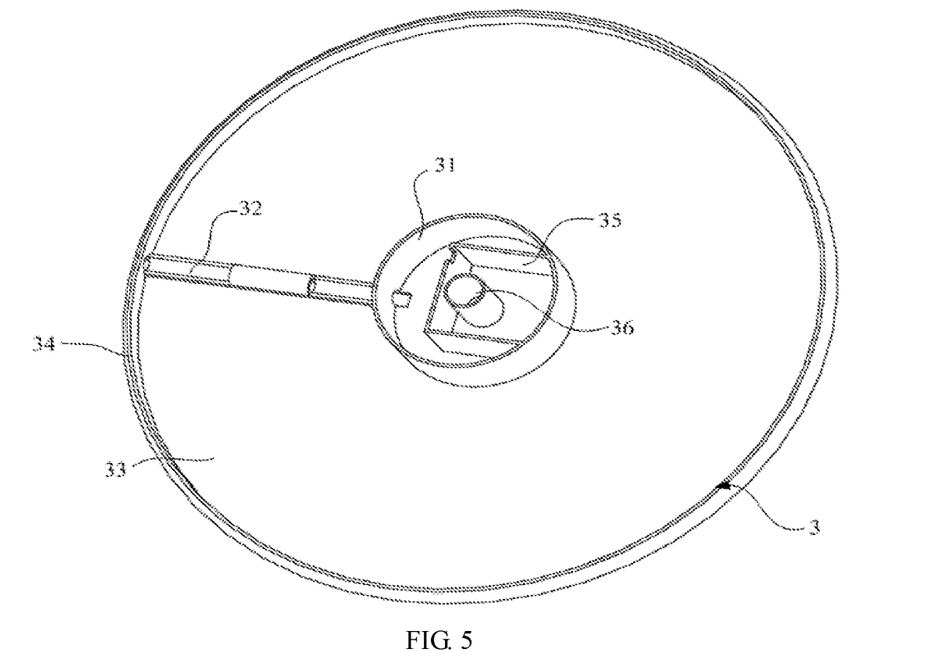
FIG. 5 is a perspective schematic diagram illustrating a base in an embodiment from another angle (a stator is not shown)
Figure 6:
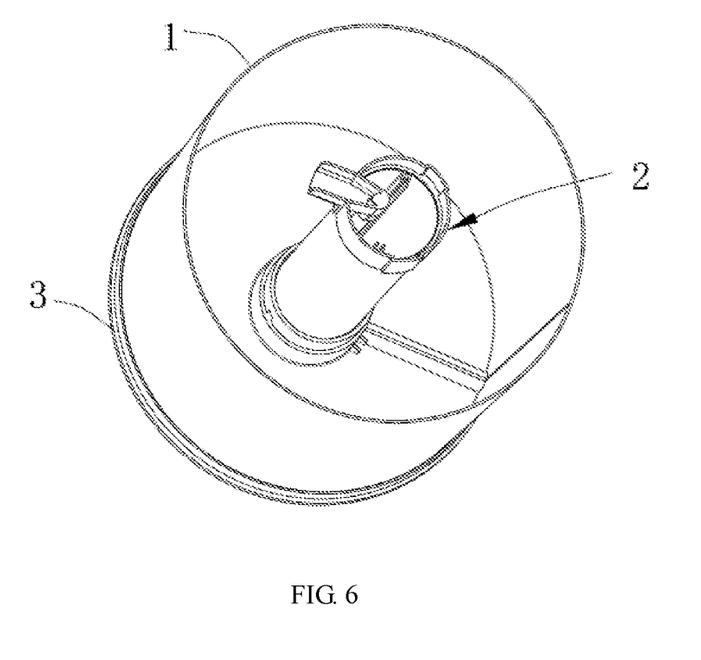
FIG. 6 is an entire structural schematic diagram illustrating an aquarium in another embodiment.
Figure 7:
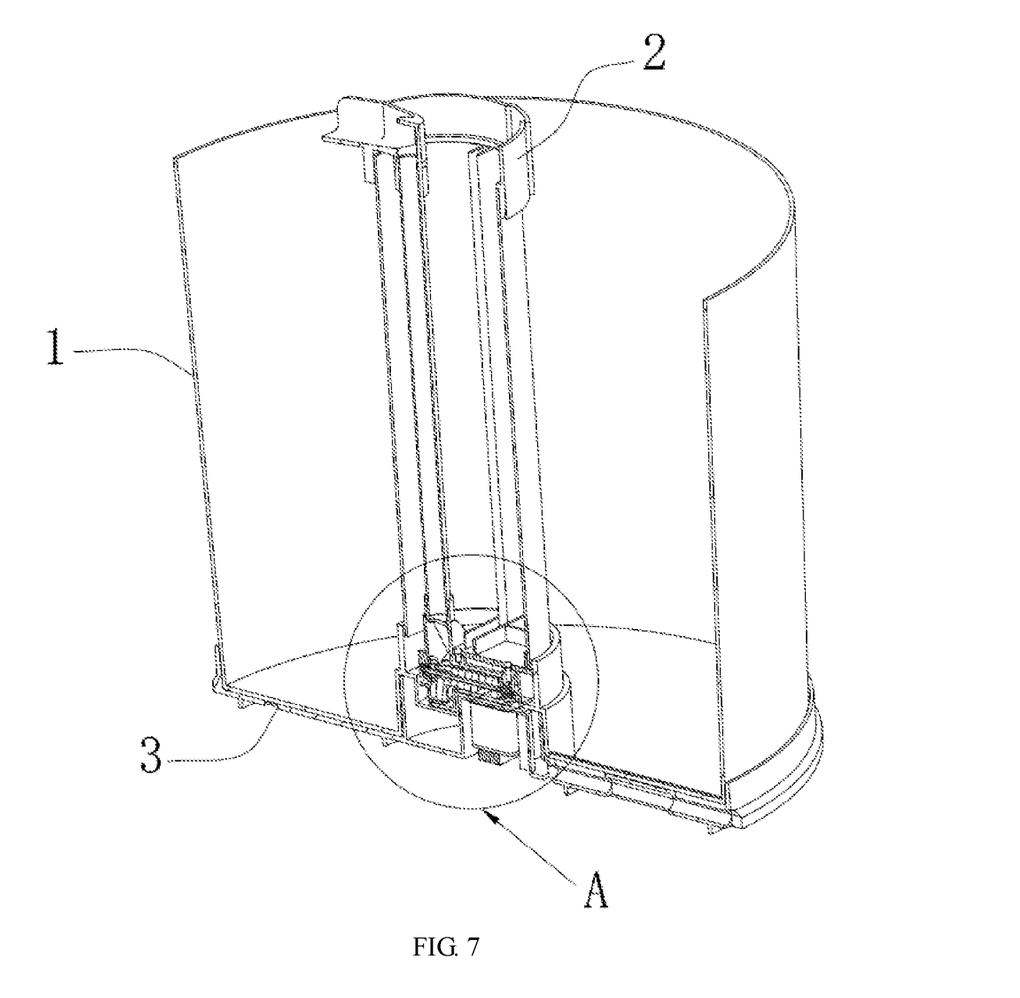
FIG. 7 is a sectional structural schematic diagram illustrating an aquarium in another embodiment.
Figure 8:
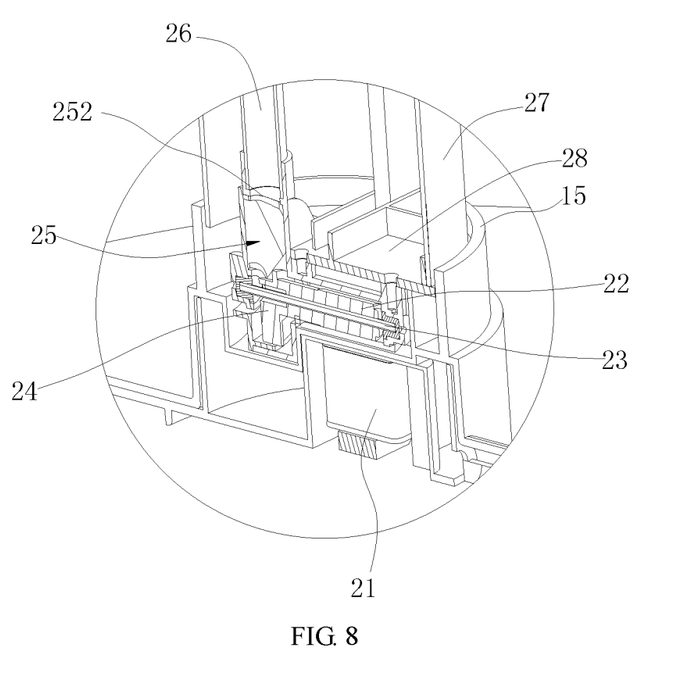
FIG. 8 is an enlarged schematic diagram of place A in FIG. 7.
Figure 9:
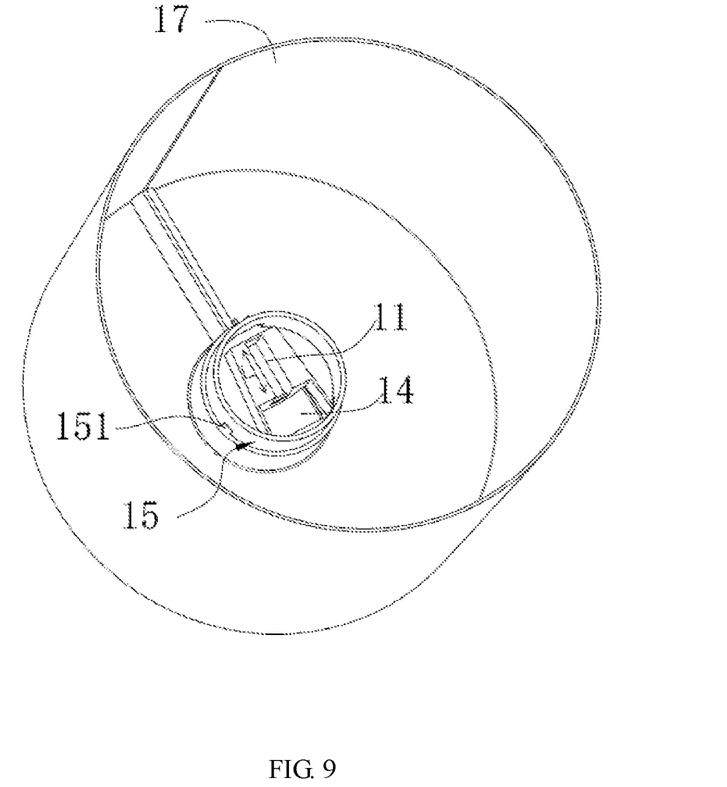
FIG. 9 is a structural schematic diagram illustrating inside of a tank body of an aquarium in another embodiment.
Figure 10:
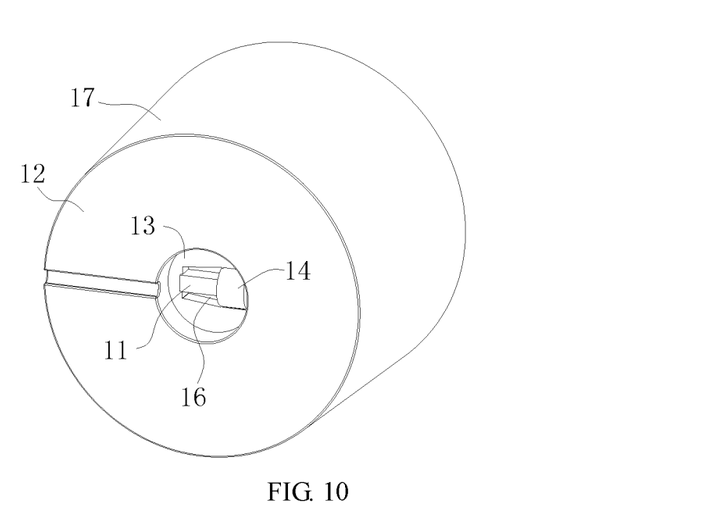
FIG. 10 is a structural schematic diagram illustrating an outer side of a bottom of a tank body of an aquarium in another embodiment.
Figure 11:
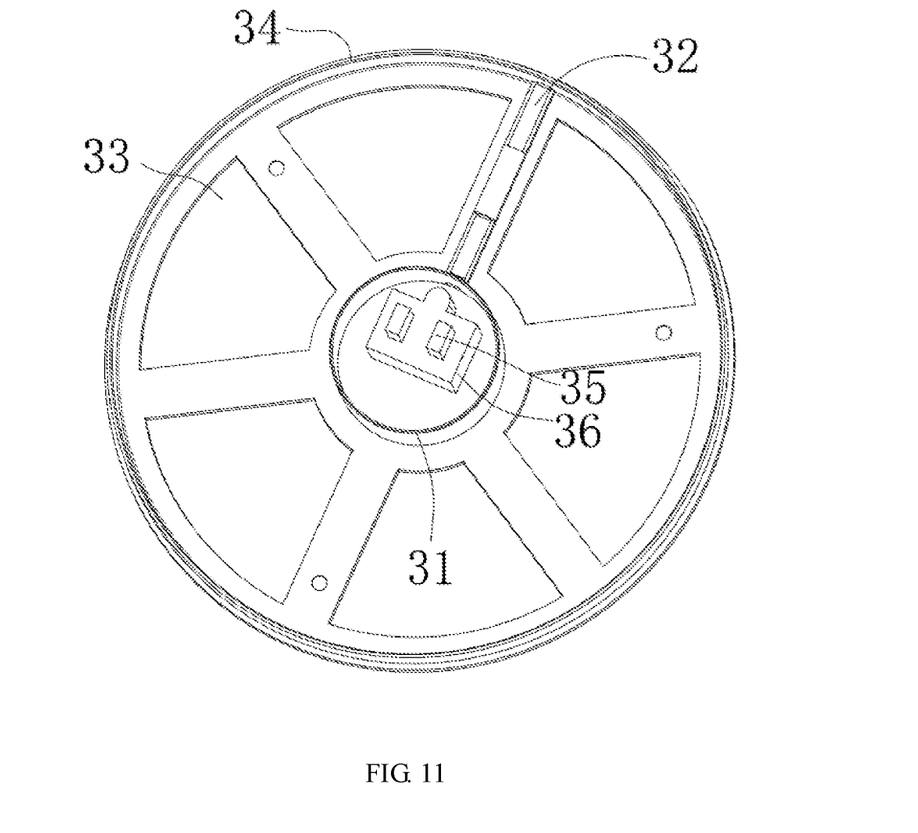
FIG. 11 is a structural schematic diagram illustrating a base of an aquarium in another embodiment.
Figure 12:
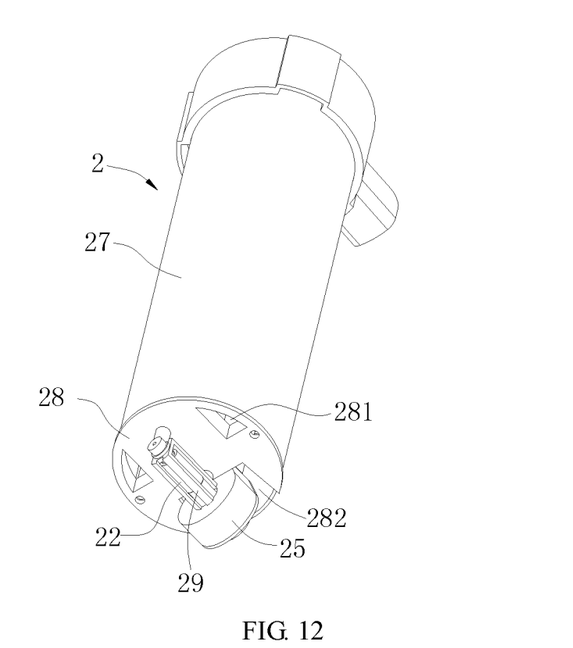
FIG. 12 is a structural schematic diagram illustrating a water pump component of an aquarium in another embodiment.

In an embodiment, as shown in FIG. 9 and FIG. 10, the bottom of the rotor chamber 11 is parallel to the bottom wall 12 of the tank body 1, and the rotor chamber 11 is communicated with the pumping house accommodating groove 14 along a length direction (L in FIG. 9 is the length direction) of the rotor chamber 11. Two stator iron core accommodating grooves 16 is formed concavely towards the inside of the tank body 1 at a part of the bottom plate 131 of the accommodating groove 13. The two stator iron core accommodating grooves 16 are respectively arranged at both sides of the rotor chamber 11. The accommodating groove 13 and the rotor chamber 11 may be at the center of the bottom wall 12 of the tank body 1, and can also be in any other position of the bottom wall 12 of the tank body 1. The accommodating groove 13 and the rotor chamber 11 may be in a shape of a tank, a square tank or other special-shape structures.

In an embodiment, a rear limiting apparatus configured to prevent the rotor 22 and the impeller 24 from separating from the rotation shaft 23 is arranged around the rotation shaft 23.

As shown in FIG. 15 to FIG. 21, in the present embodiment, the rear limiting apparatus at least includes a limiting mechanism 4 arranged around the rotation shaft 23 of the water pump. The rotation shaft 23 has a first rotation shaft end part 231 that extends out of the impeller 24 and a second rotation shaft end part 232 that extends out of the rotor 22. The limiting mechanism 4 is arranged between the rotor 22 and the second rotation shaft end part 232. When the rotation shaft 23 is drawn out to the outside of the rotor chamber 11, the limiting mechanism 4 arranged on the second rotation shaft end part 232 of the rotation shaft 23 can limit the rotor 22 and the impeller 24 which are installed around the rotation shaft 23 to the rotation shaft 23, so that the rotor 22 and the impeller 24 can be drawn out together with the rotation shaft 23, so as to facilitate assembly and maintenance.

Figure 15:
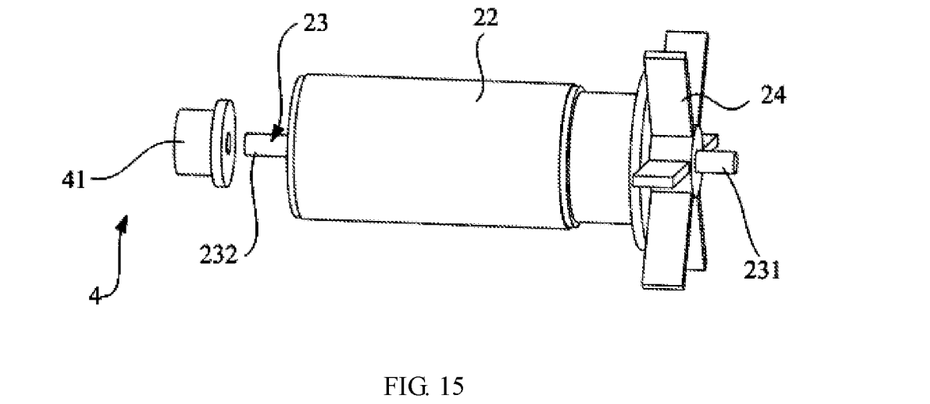
FIG. 15 is an exploded state diagram illustrating a rear limiting apparatus in an embodiment.
Figure 16:
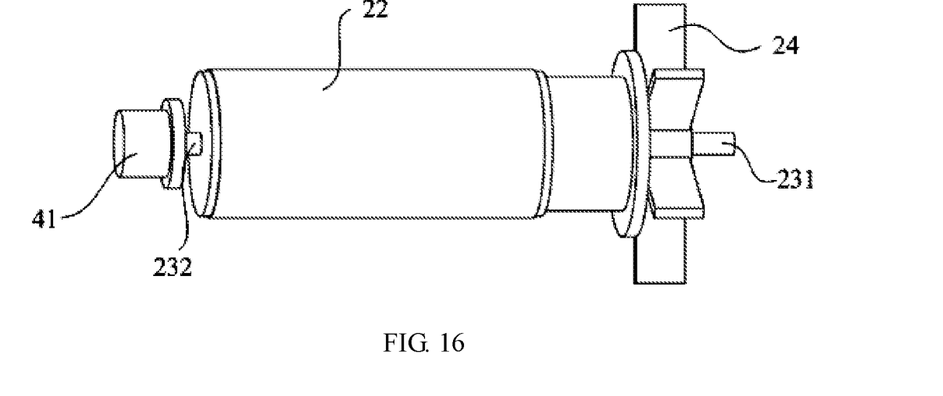
FIG. 16 is a use state diagram illustrating a rear limiting apparatus in an embodiment.

In an embodiment, as shown in FIG. 15 to FIG. 16, the limiting mechanism 4 includes a limiting sheath 41 sleeved around the rotation shaft 23. The limiting sheath 41 is detachably arranged on the second rotation shaft end part 232 of the rotation shaft 23.

In the present embodiment, the limiting sheath 41 is a rubber sheath. The limiting sheath 41 and the second rotation shaft end part 232 of the rotation shaft 23 are connected with an interference fit. The limiting sheath 41 of rubber material and the rotation shaft 23 are connected with an interference fit, so that the limiting sheath 41 is fixed to the second rotation shaft end part 232 of the rotation shaft 23, so as to limit movement of the rotor 22 and the impeller 24 towards the second rotation shaft end part 232 along an axial direction of the rotation shaft 23 and avoid slide or drop of the rotor 22 and the impeller 24.

Figure 17:
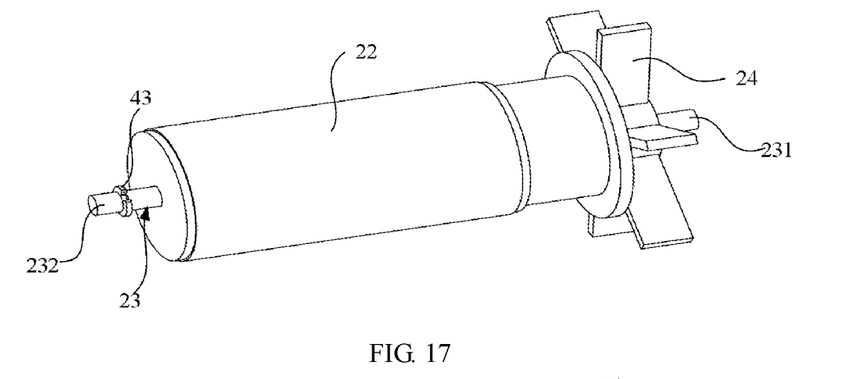
FIG. 17 is a use state diagram illustrating a rear limiting apparatus in another embodiment.
Figure 18:
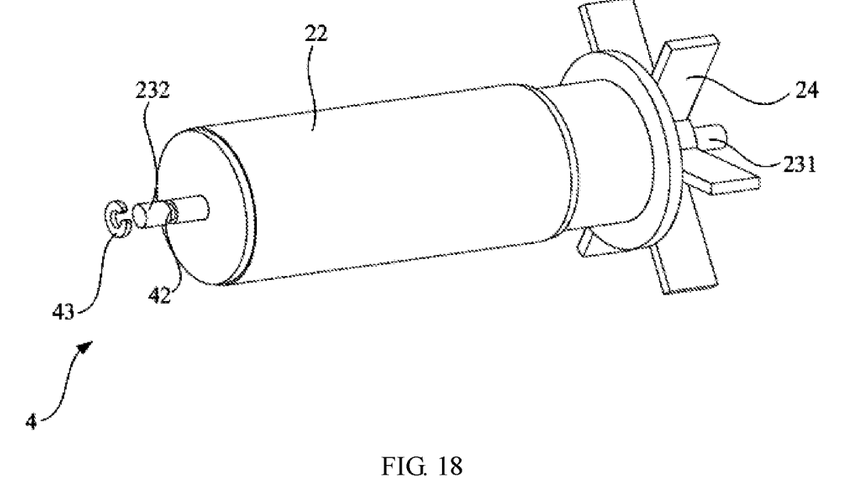
FIG. 18 is an exploded state diagram illustrating a rear limiting apparatus in another embodiment.

In another embodiment, as shown in FIG. 17 and FIG. 18, the limiting mechanism 4 includes a limiting groove 42 and a limiting clamping spring 43. The limiting groove 42 is circularly formed in the second rotation shaft end part 232 of the rotation shaft 23. The limiting clamping spring 43 is selectively clamped into the limiting groove 42, so as to limit movement of the rotor 22 and the impeller 24 towards the second rotation shaft end part 232 along the axial direction of the rotation shaft 23 and avoid slide or drop of the rotor 22 and the impeller 24.

In the present embodiment, outside diameter of the limiting clamping spring 43 is greater than a diameter of a rotor shaft hole of the rotor 22.

Figure 19:
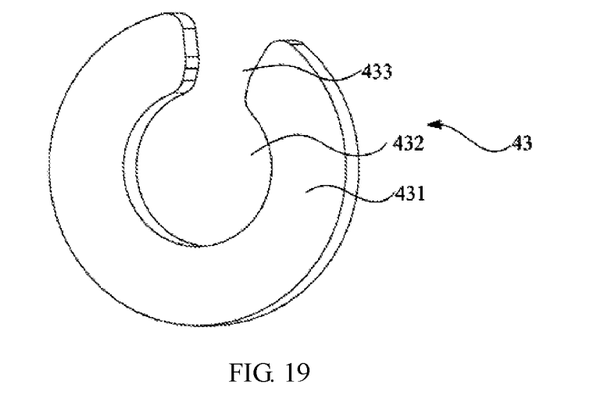
FIG. 19 is a structural schematic diagram illustrating a limiting clamping spring in FIG. 17.

In an embodiment, as shown in FIG. 19, the limiting clamping spring 43 includes a clamping spring body 431, which is a "C"-shaped flat plate. A clamping hole 432 configured to accommodate a groove bottom of the limiting groove 42 is formed in the clamping spring body 431. A clamping spring opening 433 is formed in the clamping spring body 431. The clamping spring opening 433 is communicated with outside of the clamping hole 432 and the clamping spring body 431. A dimension of the clamping spring opening 433 is slightly smaller than a diameter of the groove bottom of the limiting groove 42. When the limiting clamping spring 43 is clamped with the limiting groove 42, the groove bottom of the limiting groove 42 enters the clamping hole 432 from the clamping spring opening 433. Since the dimension of the clamping spring opening 433 is smaller than the diameter of the groove bottom of the limiting groove 42, when the groove bottom of the limiting groove 42 completely enters the clamping hole 432, the clamping spring opening 433 is not extruded and elastically recovered to an original state, so as to limit the groove bottom of the limiting groove 42 into the clamping hole 432.

In an embodiment, the clamping spring body 431 is in a shape of a circular ring, and the clamping hole 432 is formed in a middle of the clamping spring body 431.

Figure 20:
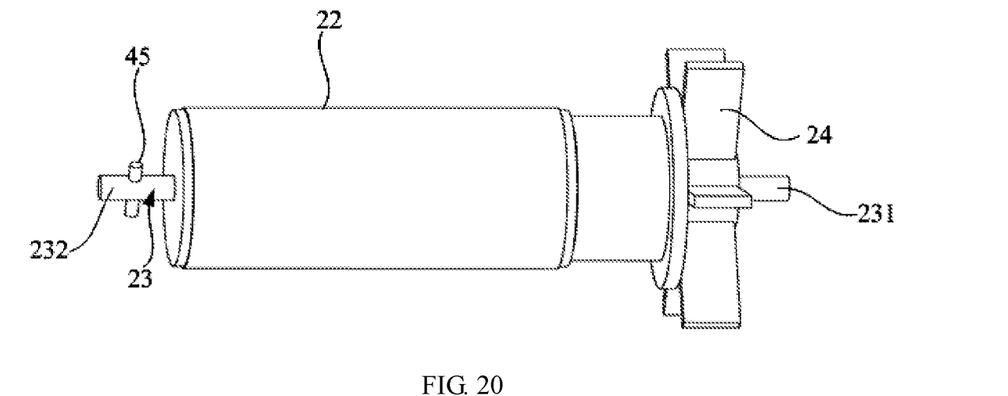
FIG. 20 is a use state diagram illustrating a rear limiting apparatus in still another embodiment.
Figure 21:
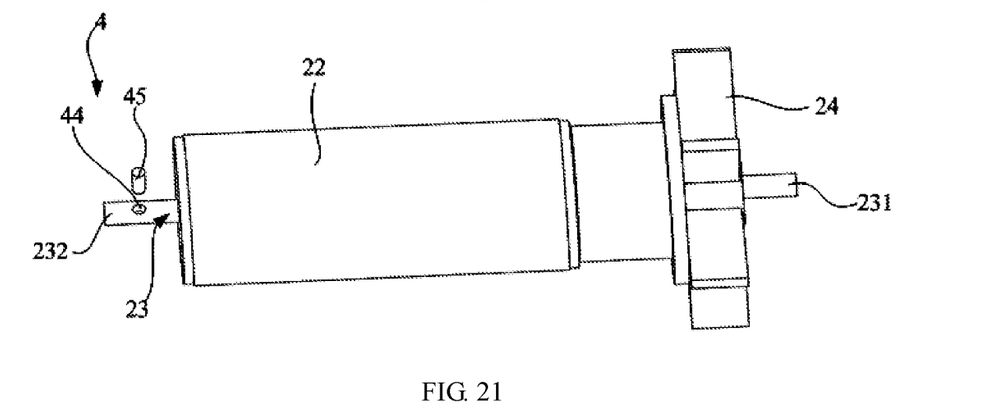
FIG. 21 is an exploded state diagram illustrating a rear limiting apparatus in still another embodiment.

In another embodiment, as shown in FIG. 20 and FIG. 21, the limiting mechanism 4 includes a limiting hole 44 and a limiting bolt 45. The limiting hole 44 is formed in the rotation shaft 23 along a radial direction of the rotation shaft 23, and is adjacent to the second rotation shaft end part 232. The limiting bolt 45 is selectively inserted into the limiting hole 44, so as to limit movement of the rotor 22 and the impeller 24 towards the second rotation shaft end part 232 along the axial direction of the rotation shaft 23 and avoid slide or drop of the rotor 22 and the impeller 24.

In the present embodiment, the limiting hole 44 is a through hole formed along the radial direction of the rotation shaft 23. The limiting bolt 45 penetrates through the limiting hole 44, and both ends of the limiting bolt 45 extend to outside of the limiting hole 44.

A length of the limiting bolt 45 is greater than the diameter of the rotor shaft hole.

In an embodiment, an internal thread is arranged in the limiting hole 44; an external thread matched with the internal thread is arranged correspondingly at a periphery of the limiting bolt 45; and the limiting bolt 45 is screwed with the limiting hole 44 through the threads.

In other embodiments, the limiting hole 44 is a blind hole formed along the radial direction of the rotation shaft 23. One end of the limiting bolt 45 is inserted into the limiting hole 44, and the other end extends to the outside of the limiting hole 44.

A distance from an outer end of the limiting bolt 45 that extends out of the limiting hole 44 to an axis of the rotation shaft is greater than a radius of the rotor shaft hole.

In an embodiment, an internal thread is arranged in the limiting hole 44; an external thread matched with the internal thread is arranged correspondingly at a periphery of one end of the limiting bolt 45 inserted into the limiting hole 44; and the limiting bolt 45 is screwed with the limiting hole 44 through the threads.

Figure 13:
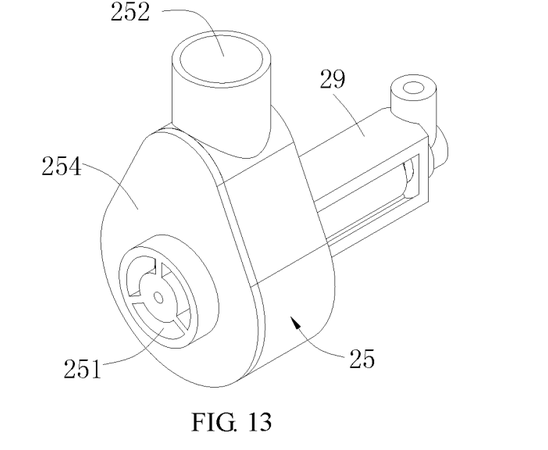
FIG. 13 is a perspective structural schematic diagram illustrating a pump core component of an aquarium in another embodiment.
Figure 14:
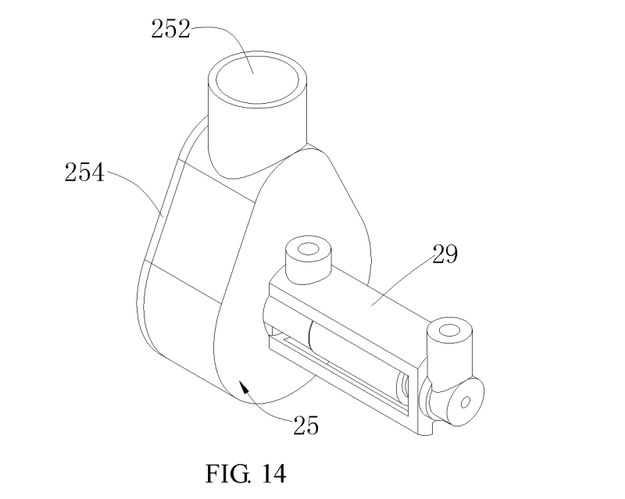
FIG. 14 is a perspective structural schematic diagram illustrating a pump core component of an aquarium in another embodiment from another angle.

In addition, the above rotor 22, the rotation shaft 23 and the impeller 24 can also be connected in other modes, and can be better matched and connected with a front shaft seat and a rear shaft seat to realize corresponding functions. As shown in FIG. 13 and FIG. 14.

In one connection mode, the rear shaft seat is arranged on one end of the rotor seat 29; the front shaft seat is arranged on the pumping house cover 254; shaft holes or bearings are arranged on the front shaft seat and the rear shaft seat; both ends of the rotation shaft 23 are respectively installed in the shaft holes or bearings of the front shaft seat and the rear shaft seat; and the rotor 22, the impeller 24 and the rotation shaft 23 are fixedly connected into a whole, and can rotate around the shaft holes or bearings of the front shaft seat and the rear shaft seat along the rotation shaft 23.

In one connection mode, the rear shaft seat is arranged on one end of the rotor seat 29; a bearing is arranged on the rear shaft seat; a middle shaft seat is arranged between the pumping house 25 and the rotor seat 29; a bearing is arranged on the middle shaft seat; an axis of the rotor 22 is fixedly connected with the rotation shaft 23; both ends of the rotation shaft 23 respectively extend out of both ends of the rotor 22; one end of the rotation shaft 23 penetrates through the bearing of the middle shaft seat and extends out by a section; the impeller 24 is fixedly connected at the end part; and the other end of the rotation shaft 23 is sleeved in the bearing of the rear shaft seat. Namely, the rotor 22, the impeller 24 and the rotation shaft 23 are fixedly connected into a whole, and the rotor 22, the impeller 24 and the rotation shaft 23 integrally rotate around the middle shaft seat and the rear shaft seat.

In one connection mode, the rear shaft seat is arranged on one end of the rotor seat 29 facing away from the pumping house 25; one end of the rotation shaft 23 is fixedly connected to the rear shaft seat, and the other end of the rotation shaft 23 is hung in the air; one end of the rotor 22 is connected with the impeller 24; shaft holes are respectively formed at axes of the rotor 22 and the impeller 24; and the shaft holes of the rotor 22 and the impeller 24 are sleeved around the rotation shaft 23 and rotate around the rotation shaft 23.

In an embodiment (by referring to FIG. 1 to FIG. 5, and some reference numerals in FIG. 1 to FIG. 5 are suitable), in the present embodiment, structures of the rotor chamber 11 and the stator chamber 31 are similar to those in above embodiments, and are different in that the rotor chamber 11 in above embodiments is arranged on the bottom wall 12 of the tank body 1, while the rotor chamber 11 in the present embodiment is arranged on the side wall 17 of the tank body 1. Optionally, the rotor chamber 11 is arranged at one side of the side wall 17 of the tank body 1 close to the inside of the tank body 1; the stator chamber 31 is arranged at one side of the side wall 17 of the tank body 1 close to the outside of the tank body 1; and the rotor chamber 11 and the stator chamber 31 face to each other.

In an embodiment, an accommodating groove 13 is formed concavely towards the inside of the tank body 1 at a part of a side wall 17 of the tank body 1; the rotor chamber 11 is formed concavely towards inside of the accommodating groove 13 at a part of a bottom plate 131 of the accommodating groove 13; an opening of the rotor chamber 11 faces to the inside of the tank body 1; and the accommodating groove 13 is not communicated with the rotor chamber 11.

A pumping house 25 is arranged on the bottom plate 131 of the accommodating groove 13 and located in the tank body 1; the pumping house 25 is communicated with the inside of the tank body 1 and the rotor chamber 11 respectively; and a water inlet 251 and a water outlet 252 are formed on the pumping house 25.

A side surface sealing cover is arranged outside the side wall 17 of the tank body 1 in a position corresponding to the rotor chamber 11. The stator chamber 31 is fixedly arranged on the side surface sealing cover; and when the side surface sealing cover is installed on the side wall 17 of the tank body 1, the stator chamber 31 is located in the accommodating groove 13.

A power line channel 32 for accommodating a power line of the water pump is arranged on the side surface sealing cover; a first end of the power line channel 32 is communicated with the stator chamber 31; and a second end extends to outside of the side surface sealing cover.

The pumping house 25 includes a pumping house side wall 253 fixedly arranged on the bottom plate 131 of the accommodating groove 13. A space for accommodating the impeller 24 is formed in the pumping house side wall 253. A pumping house cover 254 configured to block the space is arranged at one end of the pumping house side wall 253 facing away from the bottom plate 131 of the accommodating groove 13.

In another embodiment, the rotor chamber 11 and the tank body 1 are integrally formed. Integral forming may be integrated injection molding by transparent plastics, and may also be realized by that the rotor chamber 11 is directly formed on the tank body 1 when the tank body 1 is manufactured by transparent glass material.

In the explanation of the Description, explanation of reference terms such as "an embodiment", "an example" and the like means that specific features, structures, materials or characteristics described in combination with the embodiment or example are included in at least one embodiment or example. In the Description, schematic expressions for the above terms do not necessarily refer to identical embodiments or examples. Moreover, described specific features, structures, materials or characteristics can be combined in any one or more embodiments or examples in a proper mode.

What is claimed is:

1. An aquarium, comprising:
   a tank body and a water pump, wherein the water pump comprises a stator and a rotor, and the tank body comprises a tank wall;
   a rotor chamber arranged at one side of the tank wall close to inside of the tank body and configured to accommodate the rotor;
   a rotation shaft configured to support the rotor and arranged in the rotor chamber;
   an impeller configured to connect with the rotor and arranged in the rotor chamber;
   a stator chamber configured to accommodate the stator, wherein the stator chamber is arranged at one side of the tank wall close to outside of the tank body and arranged at a position corresponding to a position of the rotor chamber so that the stator drives the rotor; and
   a rear limiting apparatus comprising a limiting mechanism arranged around the rotation shaft; wherein
   the stator is encapsulated in the stator chamber, an encapsulating chamber is arranged in the stator chamber, the stator is encapsulated in the encapsulating chamber, and an isolating chamber matched with the rotor chamber is arranged in the encapsulating chamber;
   a part of a bottom wall of the tank body protrudes towards the inside of the tank body to form an accommodating groove; a part of a bottom plate of the accommodating groove protrudes towards inside of the accommodating groove to form the rotor chamber;
   the rotation shaft has a first rotation shaft end part that extends out of the impeller and a second rotation shaft end part that extends out of the rotor; and
   the limiting mechanism comprises a limiting sheath sleeved around the rotation shaft, the limiting sheath is a rubber sheath and is detachably arranged on the second rotation shaft end part of the rotation shaft, and the limiting sheath and the second rotation shaft end part of the rotation shaft are connected in a manner of interference fit so that movement of the rotor and the impeller towards the second rotation shaft end part along an axial direction of the rotation shaft is limited and thus slide or drop of the rotor and the impeller is avoided.

2. The aquarium according to claim 1, wherein an opening of the rotor chamber faces to the inside of the tank body.

3. The aquarium according to claim 2, further comprising a pumping house arranged on the bottom plate of the accommodating groove and located in the tank body; wherein the pumping house is communicated with the inside of the tank body and the rotor chamber respectively; and a water inlet and a water outlet are formed on the pumping house.

4. The aquarium according to claim 3, wherein the pumping house comprises a pumping house side wall and a pumping house cover; the pumping house side wall is fixedly arranged on the bottom plate of the accommodating groove to form a space for accommodating the impeller; and the pumping house cover is arranged at one end of the pumping house side wall facing away from the bottom plate of the accommodating groove and is configured to block the space.

5. The aquarium according to claim 3, further comprising a pumping house accommodating groove; wherein the pumping house accommodating groove is disposed at one side of the rotor chamber along a horizontal direction and is communicated with the rotor chamber; one side of the pumping house is connected with a rotor seat; the rotor is arranged in the rotor seat; the impeller is arranged in the pumping house; the rotor seat is arranged in the rotor chamber; and the pumping house is arranged in the pumping house accommodating groove.

6. The aquarium according to claim 5, further comprising a connecting seat circularly arranged in the tank body and located on the bottom plate; wherein an opening of the connecting seat faces to an opening of the tank body; the pumping house accommodating groove and the rotor chamber are arranged in the connecting seat; a lower water inlet is formed at a lower end of the connecting seat; a connecting plate is arranged at the opening of the connecting seat; the connecting plate is detachably connected with the rotor seat; a water guiding cylinder is fixedly connected with one side of the connecting plate facing away from the rotor seat; and openings are respectively formed at both ends of the water guiding cylinder.

7. The aquarium according to claim 6, wherein a connecting plate water inlet and a connecting plate water outlet are formed in the connecting plate.

8. The aquarium according to claim 5, wherein the water outlet is formed on a top of the pumping house; the water outlet is connected with a drain pipe; the pumping house is provided with a pumping house cover at one side of the pumping house facing away from the rotor seat; and the water inlet is formed on the pumping house cover.

9. The aquarium according to claim 2, further comprising a base arranged under a bottom of the tank body; wherein the stator chamber is fixedly arranged on the base; and when the base is installed under the bottom of the tank body, the stator chamber is located in the accommodating groove.

10. The aquarium according to claim 9, wherein a power line channel for accommodating a power line of the water pump is arranged on the base; a first end of the power line channel is communicated with the stator chamber; and a second end of the power line channel extends to outside of the base.

11. The aquarium according to claim 2, wherein the stator chamber and the tank body are integrally formed.

12. The aquarium according to claim 1, wherein the rotor chamber is arranged at one side of the side wall of the tank body close to the inside of the tank body; the stator chamber is arranged at one side of the side wall of the tank body close to the outside of the tank body; and a position of the rotor chamber corresponds to a position of the stator chamber so that the stator drives the rotor.

13. The aquarium according to claim 12, wherein an accommodating groove is formed concavely towards the inside of the tank body at a part of a side wall of the tank body; the rotor chamber is formed concavely towards inside of the accommodating groove at a part of a bottom plate of the accommodating groove; an opening of the rotor chamber faces to the inside of the tank body; and the accommodating groove is not communicated with the rotor chamber.

14. The aquarium according to claim 1, wherein the stator chamber and the tank body are integrally formed.

15. The aquarium according to claim 1, wherein the stator chamber and the tank body are integrally formed.

16. An aquarium, comprising:
a tank body and a water pump, wherein the water pump comprises a stator and a rotor, and the tank body comprises a tank wall;
a rotor chamber arranged at one side of the tank wall close to inside of the tank body and configured to accommodate the rotor;
a rotation shaft configured to support the rotor and arranged in the rotor chamber;
an impeller configured to connect with the rotor and arranged in the rotor chamber;
a stator chamber configured to accommodate the stator, wherein the stator chamber is arranged at one side of the tank wall close to outside of the tank body and arranged at a position corresponding to a position of the rotor chamber so that the stator drives the rotor; and
a rear limiting apparatus comprising a limiting mechanism arranged around the rotation shaft; wherein
the stator is encapsulated in the stator chamber, an encapsulating chamber is arranged in the stator chamber, the stator is encapsulated in the encapsulating chamber, and an isolating chamber matched with the rotor chamber is arranged in the encapsulating chamber;
a part of a bottom wall of the tank body protrudes towards the inside of the tank body to form an accommodating groove; a part of a bottom plate of the accommodating groove protrudes towards inside of the accommodating groove to form the rotor chamber;
the rotation shaft has a first rotation shaft end part that extends out of the impeller and a second rotation shaft end part that extends out of the rotor;
the limiting mechanism comprises a limiting groove and a limiting clamping spring, the limiting groove is circularly formed in the second rotation shaft end part of the rotation shaft, and the limiting clamping spring is selectively clamped into the limiting groove so that movement of the rotor and the impeller towards the second rotation shaft end part along the axial direction of the rotation shaft is limited and thus slide or drop of the rotor and the impeller is avoided.

17. An aquarium, comprising:
a tank body and a water pump, wherein the water pump comprises a stator and a rotor, and the tank body comprises a tank wall;
a rotor chamber arranged at one side of the tank wall close to inside of the tank body and configured to accommodate the rotor;
a rotation shaft configured to support the rotor and arranged in the rotor chamber;
an impeller configured to connect with the rotor and arranged in the rotor chamber;
a stator chamber configured to accommodate the stator, wherein the stator chamber is arranged at one side of the tank wall close to outside of the tank body and arranged at a position corresponding to a position of the rotor chamber so that the stator drives the rotor; and
a rear limiting apparatus comprising a limiting mechanism arranged around the rotation shaft; wherein
the stator is encapsulated in the stator chamber, an encapsulating chamber is arranged in the stator chamber, the stator is encapsulated in the encapsulating chamber, and an isolating chamber matched with the rotor chamber is arranged in the encapsulating chamber;
a part of a bottom wall of the tank body protrudes towards the inside of the tank body to form an accommodating groove; a part of a bottom plate of the accommodating groove protrudes towards inside of the accommodating groove to form the rotor chamber;
the rotation shaft has a first rotation shaft end part that extends out of the impeller and a second rotation shaft end part that extends out of the rotor;
the limiting mechanism comprises a limiting hole and a limiting bolt, the limiting hole is formed in the rotation shaft along a radial direction of the rotation shaft and is adjacent to the second rotation shaft end part, and the limiting bolt is selectively inserted into the limiting hole so that movement of the rotor and the impeller towards the second rotation shaft end part along the axial direction of the rotation shaft is limited and thus slide or drop of the rotor and the impeller is avoided.

* * * * *